Figure 1:
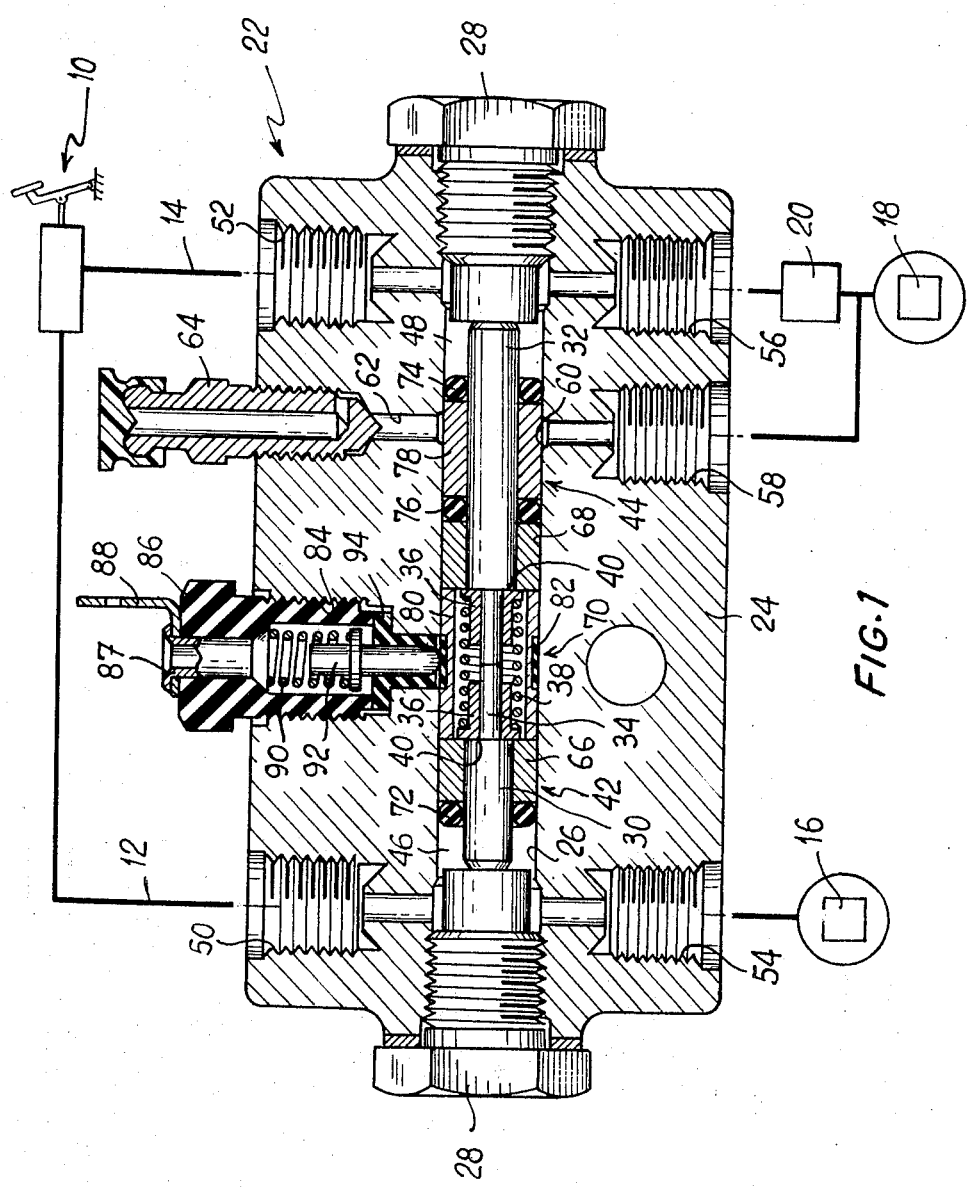

United States Patent
Eloi et al.

[11] 3,872,885
[45] Mar. 25, 1975

[54] PRESSURE FAILURE SWITCH

[75] Inventors: Christian Eloi, Garges-les-Gonesses; Christian Riquart, Paris, both of France

[73] Assignee: Societe Anonyme D.B.A.

[22] Filed: Dec. 13, 1973

[21] Appl. No.: 424,525

[30] Foreign Application Priority Data
Dec. 27, 1972 France .............................. 72.46393
Mar. 14, 1973 France ............................ 73.099028

[52] U.S. Cl. ............... 137/554, 200/82 D, 340/52 C
[51] Int. Cl. .......................................... H01h 35/10
[58] Field of Search ......... 137/554; 200/82 D, 82 C; 303/6 C, 84 A, 84 R; 340/52 C, 240, 242, 244 E

[56] References Cited
UNITED STATES PATENTS
| | | | |
|---|---|---|---|
| 3,374,322 | 3/1968 | Miller | 200/82 D |
| 3,606,486 | 9/1971 | Doerrer | 200/82 D X |
| 3,672,728 | 6/1972 | Keady et al. | 200/82 D X |
| 3,672,732 | 6/1972 | Green | 200/82 D X |

*Primary Examiner*—Henry T. Klinksiek
*Attorney, Agent, or Firm*—Leo H. McCormick, Jr.; William N. Antonis

[57] ABSTRACT

The invention relates to a pressure imbalance detector for use in a vehicle hydraulic brake system having two separate sub-circuits, wherein an electrical indicator device is activated if one of the brake sub-circuits fails. The indicator device includes an electrical switch actuated by a movable sleeve located between two pistons, each of which being responsive to the fluid pressure existing in one sub-circuits. The pistons have an annular shape for receiving fixed rods on which bear the ends of a resilient assembly. The resilient assembly which is located in the inner space of the sleeve, has a spring inserted between two cups. Each cup is adapted to engage the adjacent rod and the corresponding piston.

12 Claims, 2 Drawing Figures

PRESSURE FAILURE SWITCH

This invention relates to a pressure imbalance detector, more particularly for use in vehicles hydraulic brake systems having two separate sub-circuits, to cause an electrical indicator device to operate if one of the brake sub-circuits fails.

Conventional fluid pressure imbalance detectors comprise two pistons, each subjected to the fluid pressure prevailing in one of the brake circuits. The pistons are connected oppositely to one another, that is to say, they exert opposite pressures on one another. When the brakes are applied, the pistons remain practically immobile if the pressures in the two brake circuits are equal. If the pressures are different, however the combined motion of the pistons is used to switch on an elctrical contact.

Detectors of this type may be provided with resilient means which urge the two pistons into their idle position, and whose prime function is to prevent the two pistons from moving when the pressure difference is too little to denote failure of one of the brake circuits. Unfortunately these resilient means return the two pistons into their idle positions systematically when the brakes are released, so that if a brake circuit fails the indicator device will not give a warning signal unless the brakes are on.

To overcome this disadvantage it has been proposed that the resilient means should be a spring compressed between two shoulders of the housing, the pistons being on opposite sides of the spring. One of the pistons can engage the spring and push back the other piston if the latter's fluid circuit fails. When braking ceases, therefore, the first piston is returned into its idle position by the spring, but the other piston behaves like a floating piston and remains where it has been pushed. In this new position the piston can always operate the indicator device, so that a failure signal is given even outside braking periods.

However, this solution presents difficulties during manufacture, since it requires a separate component to detect the position of each position. Also, it is desirable to reduce the bulk of the resulting detector.

An object of the invention is to provide a pressure imbalance detector which is very compact and extremely simple to manufacture.

According to the invention, the pressure imbalance detector comprises a housing with a bore therein, two annular pistons slidably mounted in said bore, the adjacent ends of the pistons being separated by a resilient system whereas the other ends of the pistons define in said bore two pressure chambers capable to be connected to two separate fluid circuits, rods fixed relative to said housing and sealingly projecting through said pistons, abutment on each of the adjacent end of the rods adapted to be engaged by the ends of the resilient system, and switching means for closing an electrical circuit in the event of motion of the pistons due to a pressure difference denoting failure of one of the fluid circuits, said means for closing comprising a movable element mounted between the pistons and engaged thereby without interference with the resilient system.

Figure 2:
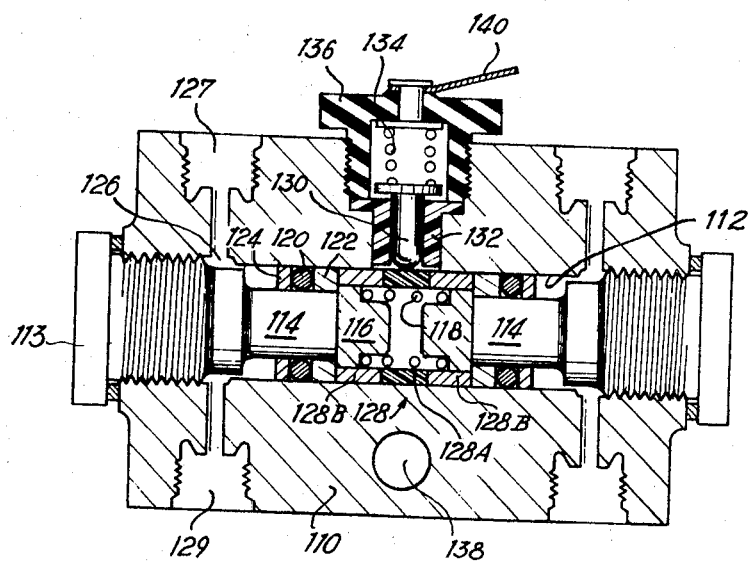

The invention will be better understood from the ensuing description referring to the accompanying drawings, in which:

FIG. 1 represents a schematic illustration of a dual brake circuit for a motor vehicle, having a pressure imbalance detector embodying the invention for indicating a brake failure, and FIG. 2 schematically illustrates another embodiment of a pressure imbalance detector having resiliently separated pressure responsive pistons.

As the FIG. 1 shows, the dual brake circuit for a motor vehicle comprises a conventional tandem master cylinder 10 of which the actuating chambers, which are hydraulic pressure sources, are connected by two independent circuits 12, 14 to two sets of brake actuators 16, 18 in the vehicle. By way of example, set 16 is associated with the brakes for the front wheels of the vehicle and set 18 with those for the rear wheels. The brake actuators of set 18 are normally connected to the master cylinder 10 not directly, but by way of a conventional braking regulating valve 20. The regulating valve 20 may, for example, be of the pressure limiting type or of the pressure connecting type, that is to say, one supplying a downstream pressure lower than is proportional to the upstream pressure when the latter exceeds a predetermined level known as the threshold pressure. The regulating valve may of course be subject to the load on the rear axle of the vehicle, so that the threshold pressure varies.

A detector 22 embodying the invention is connected between the two circuits 12 and 14. More particularly, the detector 22 is mounted between the master cylinder 10 and the regulating valve 20, that is, upstream of this valve.

The detector 22 has a housing 24 traversed lengthways a bore bore 26. Each end of the bore is closed in a fluid tight manner by a plug 28. Two rods 30, 32 coaxial with the bore and bearing respective projections 34 are held between the plugs. The projections 34 are placed end to end, facing one another, and slidably receive retainer cups 36 whose smaller-diameter portions guide a return spring 38. The spring normally urges the cups 36 onto the shoulders 40 on the rods 30, 32. It should be noted that the retaining portions of the cups 36 are slightly greater in diameter that the rods. The rods 30, 32 carry two pistons 42, 44 which are slidable in a fluid tight manner both on the rods and in the bore 26. At its end of the bore each piston defines a pressure chamber 46 or 48. These chambers are connected to their respective circuits 12, 14 by inlet orifices 50, 52 and outlet orifices 54, 56 respectively in the housing 24.

The housing 24 also contains a short-circuiting orifice 58, which is connected to the bore 26 near the end asssociated with the chamber 48. This orifice 58 is connected directly to the brake actuator set 18 at a junction downstream of the regulating valve 20, in contrast to the outlet orifice 56 which is connected upstream of this valve. The short-circuiting orifice opens onto a chamfered annular groove 60 and communicates with a drainage duct 62 closed by a plug 64.

The pistons 42, 44 comprise both respective rigid rings 66, 68, separated by a movable member 70, and an O-ring seal 72, 74 adjacent to the associated chamber 46 or 48. The O-ring seals co-operate in a fluid tight manner with both the inside surface of the cylinder and the associated rods. The piston 44, which acts as a control valve for the orifice 58 also comprises another O-ring seal 76 situated between its ring 68 and a tubular spacer 78. The length of the spacer 78 is such that, irrespective of the position of the piston 44 in the bore, the seal 76 separates the orifice 58 from the space lying between the pistons and containing the movable member 70.

In the particular embodiment described, the movable member 70 co-operates with a switch device connected to the electrical circuit of a warning device (not shown). The member 70 comprises a sleeve member 80, which slides with slight friction in the bore 26. The ring member 80 embraces the spring 38 and the retainer cups 36 without interfering with them. It should be noted that each rigid ring 66, 68 is capable of abutting directly on the movable member 70 and on one of the retainer cups 36. The length of the sleeve member 80 is substantially equal to the axial distance between the facing each other faces of rings 66, 68 when the latters are in a position in engagement with the adjacent cup bearing on their corresponding end rod. The sleeve member 80 is of electrically conductive material, with a central insulating zone 82 on its periphery. The housing 24, which is of electrically conductive material, contains a recess 84 for an insulating plug 86, to whose outer end an electrical terminal 88 is fixed by means of a metal rivet 87. The terminal is normally connected to the supply circuit of the warning device, whereas the housing 24 is connected to the vehicle's ground. A coil spring 90 bearing on the rivet 87 urges an electrically conductive plunger 92, which slides in an insulating duct 94, into the bore.

The detector just described operates as follows. Note that the FIG. 1 shows its various components in their idle "central" position, which they occupy when both brake circuits are pressurised and when the pressures in the chambers 46, 48 remain substantially equal.

Since the pressures acting on the pistons are substantially equal, the pistons, reacting on one another by way of the sleeve member 80, are returned to this central position by the combined effects of the spring 38, retainer cups 36 and shoulders 40. When the sleeve member 80 is in its central position, the plunger 92 bears on the insulating zone 82, breaking the electrical circuit between the terminal 88 and the earth. The position of the seal 74 is such that the orifice 58 is cut off from the pressure chamber 48.

When braking begins, therefore, both sets of brake actuators are subjected to substantially the same pressure, the regulating valve being open. However, once the threshold pressure is reached upstream of the valve 20, the downstream pressure, that is, the pressure in the brake actuator 18 and at the orifice 58, in less than the upstream pressure. It should be noted that the presence of pressure at the orifice 58 does not in any way affect the balance of the piston 44, nor does the presence of the valve 20 in the circuit 14, since the valve is downstream of the failure detector.

Let us assume that one of the brake circuits fails, for example the circuit 12 associated with the chamber 46 and the front wheels of the vehicle. When the pressure difference between the two chambers 46, 48 exceeds a predetermined value, the spring 38 yields to the force acting on the piston 44, which then pushes the piston 42 and sleeve member 80 to the left in FIG. 1. As a result, firstly, the plunger 92 comes to bear on a conductive portion of the sleeve member 80 and closes the electrical circuit of the warning device, and, secondly, the movement of the seal 74 towards the left and past the groove 60 provides a direct connection between the master cylinder 10 and the brake actuators 18. This makes the vehicle much safer, since in the event of failure of the front brake circuit it is desirable to supply the rear brake circuit with the maximum pressure delivered by the master cylinder 10.

The chamfering of the groove 60 is intended to prevent the seal 74 from deteriorating rapidly.

When the driver releases the brake pedal, the spring 38 acting through right cup 36 pushes the piston 44 back into its central position, whereas the pistons 42 disengaged from left cups 36, and sleeve member 80 remain off-centre and keep the electrical circuit closed.

Once the faulty circuit has been repaired, the piston 42 and sleeve member 80 return to their central positions automatically the first time the brake pedal is depressed.

Similarly if brake circuit 14 should fail, a pressure differential will occur between chambers 46 and 48. This pressure diffferential will move pistons 42 and 44 toward chamber 48 to permit disengagement of plunger 92 from the insulating zone 82 into contact with sleeve 80 for activating the electrical circuit of the warning device. When the driver releases the brake pedal, spring 38 acting on cup 36 pushes piston 42 back to its central position, whereas piston 44 is disengaged from the right cup 36 and sleeve member 80 remain off center to maintain the electrical circuit closed.

The pressure imbalance detector shown in FIG. 2 has a housing 110 traversed lengthways by a bore 112. Each end of the bore 112 is closed in a fluid tight manner by a plug 113, bearing a rod-like axial extension 114 whose diameter is less than that of the bore 112. Respective discs 116 adjoin the mutually facing ends of the axial rods 114, and a spring 118 is compressed between the two discs 116. The discs are slightly greater in diameter than the axial rods.

Each axial rod 114 bears an annular piston 120, for example a single O-ring of rubber or synthetic plastic material. The pistons 120 are slidable in a fluid tight manner both in the bore 112 and on the axial rods 114. The O-rings 120 may be backed up by retaining washers on one or both sides: in FIG. 2, each ring 120 is between two washers 122, 124. The washer 122 can engage the edge of the disc 116 adjacent to it (a shoulder on which serves to guide the spring 118); the washer 124 adjoins a pressure chamber 126, provided with an inlet orifice 127 and outlet orifice 129 for pressue fluid, more particularly the fluid for a brake system having two separate circuits.

A ring member 128 slides with slight friction in the bore 112, in the space between the axial rods 114. The ring member consists of a ring 128A of insulating material adjoined on each side by a metal ring 128B. Note that the ring member 128 encloses the spring 118 without interfering either with the spring or with the retaining discs 116. The ends of the ring member 128 can be engaged by the washers 122 situated between each piston 120 and the associated disc 116.

FIG. 2 illustrates the "idle" position, taken up by the pistons when the fluid passing through the pressure chambers 186 exerts substantially equal pressures on both pistons 120. In this position the washers 122 bear on the discs 116, and the insulating ring 28A of the ring member 28 occupies a central position.

Means for detecting the position of the ring member 28 are formed by the combination of the ring member 128 with a metal plunger 130, which passes through the wall of the housing 110 by way of an insulating duct 132. The end of the plunger 130 is spherical and is brought to bear on the ring member 128 by a spring 134 housed in an insulating plug 136 screwed on to the housing 110. The plunger 130 is designed to be connected by a wire 140 to an indicator circuit (not shown). Finally a fixing hole 138 is provided in the housing 110.

The operation of the device illustrated in FIG. 2 is identical to the operation illustrated in FIG. 1 and will not be described once again.

We claim:

1. Pressure imbalance detector comprising a housing with a bore therein, two annular pistons slidably mounted in said bore, the adjacents ends of the pistons being separated by a resilient system whereas the other ends of the pistons define in said bore two pressure chambers capable of being connected to two separate fluid circuits, rods fixed relative to said housing and sealingly projecting through said pistons, said rods being adapted to be engaged by the ends of the resilient system and switching means for closing an electrical circuit in the event of motion of the pistons due to a pressure difference denoting failure of one of the fluid circuits, said means for closing comprising a movable element mounted between the pistons and engaged thereby without interference with the resilient system.

2. Pressure imbalance detector as claimed in claim 1, wherein the resilient system comprises a spring bearing on the rods by way of circular members whose peripheries can be engaged by the pistons slidable on the rods.

3. Pressure imbalance detector as claimed in claim 2 wherein the rods are attached to plugs closing the ends of the bore.

4. An imbalance detector as claimed in claim 2, wherein respective projections on the rods adjoin one another, and the rods occupy substantially the entire length of the bore.

5. An imbalance detector as claimed in claim 1, wherein said movable element is a sleeve which does not interfere with the resilient system.

6. Pressure imbalance detector as claimed in claim 1, wherein the switching means comprise a metal plunger passing through the bore wall by way of an insulating duct so as to project into the space between the two pistons and make contact with the movable element, which comprises two conductive regions electrically connected to the housing earth, and located on each side of a region insulated from the earth.

7. Pressure imbalance detector as claimed in claim 6, wherein the movable element comprises a ring of insulating material between two metal rings.

8. Pressure imbalance detector as claimed in claim 1, wherein each piston comprises a rigid ring adjacent to the movable member and an O-ring seal adjacent to the associated pressure chamber and co-operating in a fluid tight manner with both the inside wall of the bore and the associated rod.

9. Pressure imbalance detector as claimed in claim 1 further comprising a short-circuiting orifice connected to the bore near one end thereof and communicating with the adjacent pressure chamber when the associated piston, termed the control piston, moves due to a pressure difference denoting a pressure drop in the other chamber.

10. Pressure imbalance detector as claimed in claim 9 wherein each piston comprises a rigid ring adjacent to the movable member and an O-ring seal adjacent to the associated pressure chamber and co-operating in a fluid tight manner with both the inside wall of the bore and the associated rod, said control piston comprising a second seal capable of cutting off the short-circuiting orifice from the space containing the resilient system, whatever the position of the control piston in the bore.

11. Pressure imbalance detector as claimed in claim 10, wherein the second seal is substantially identical to the O-ring seal and the two seals are separated by a rigid tubular spacer.

12. Pressure imbalance detector as claimed in claim 9 wherein the bore contains a chamfered annular groove opposite the orifice.

* * * * *